United States Patent Office 3,737,531
Patented June 5, 1973

---

3,737,531
N - DIARYL-PYRIDYL-METHYL-IMIDAZOLES,
SALTS THEREOF AS ANTIFUNGAL AGENTS
Wilfried Draber, Karlheinz Buchel, and Manfred Plempel,
Wuppertal-Elberfeld, Germany, assignors to Farbenfabriken Bayer Aktiengesellschaft, Leverkusen, Germany
No Drawing. Original application July 3, 1969, Ser. No. 839,089, now Patent No. 3,629,273, dated Dec. 21, 1971. Divided and this application Feb. 25, 1971, Ser. No. 118,993
Int. Cl. A61k 27/00
U.S. Cl. 424—263
34 Claims

ABSTRACT OF THE DISCLOSURE

N-diaryl-pyridyl-methyl-imidazoles of the formula:

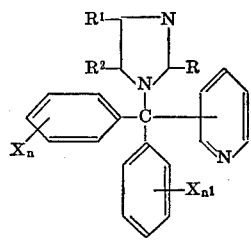

wherein

R, $R^1$ and $R^2$ are each hydrogen, straight or branched chain lower alkyl or straight or branched chain lower alkenyl, X is straight or branched chain alkyl of 1 to 12 carbon atoms, straight or branched chain alkenyl of 1 to 12 carbon atoms or an electronegative moiety, and $n$ and $n^1$ are each integers from 0 to 2, or pharmaceutically acceptable non-toxic salts thereof are produced by reacting diaryl-pyridyl carbinols of the formula:

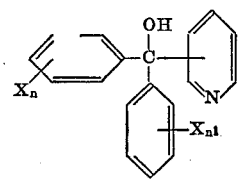

wherein X, $n$ and $n^1$ are as above defined, in an inert organic solvent with a reagent suitable for chlorination of tertiary alcohols and reacting the diaryl-pyridyl-methyl chloride thus produced with an acid-binding agent and imidazole or lower alkyl imidazole. The salts are obtained by reaction of the compounds with the corresponding acid.

These compounds are useful as antimycotics and should generally be administered in the range of about 20 to 100 mg./kg.

---

This is a division of our co-pending application Ser. No. 839,089 filed July 3, 1969, now P.S. Patent No. 3,629,273.

The present invention is concerned with N-diaryl-pyridyl-methyl-imidazoles, their salts and the production of these compounds. More particularly, the N-diaryl-pyridyl-methyl-imidazoles and their salts of the present invention are represented by the formula:

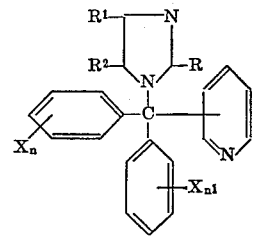

wherein

R, $R^1$ and $R^2$ are each hydrogen, straight or branched chain lower alkyl or straight or brancehd chain lower alkenyl, X is straight or branched chain alkyl of 1 to 12 carbon atoms, straight or branched chain alkyenyl of 1 to 12 carbon atoms or an electronegative moiety, and $n$ and $n^1$ are each integers from 0 to 2.

These compounds have been found to be useful as antimycotics, particularly against Candidosis and Dermatomycosis caused by Trichophyton and Microsporium species.

In a preferred embodiment of the present invention the alkyl or alkenyl groups of R, $R^1$ and $R^2$ preferably contain 1 to 4 carbon atoms and the alkyl or alkenyl groups of X preferably contain 1 to 4 carbon atoms. Suitable electronegative substituents are the halogens, i.e. fluorine, chlorine, bromine, and iodine as well as nitro, cyano, trifluoromethyl or alkylmercapto.

The salts of the N-diaryl-pyridyl-methyl-imidazoles are preferably those formed with pharmaceutically acceptable non-toxic acids. Particularly useful acid salts are those formed with the halogen hydracids, phosphoric acids, sulphonic acids, mono- and bifunctional carboxylic acids and hydroxycarboxylic acids such as acetic acid, propionic acid, maleic acid, succinic acid, fumaric, acid tartaric acid, citric acid, salicylic acid, sorbic acid, lactic acid and 1,5-naphthalene-disulphonic acid. Hydrohalides (especially chlorides) lactates and salicylates of (I) are of particular interest and value.

The compounds according to the invention can be produced by reacting in known manner, preferably at reflux temperatures, diaryl-pyridyl carbinols, which are known or can be obtained according to known methods, of the formula:

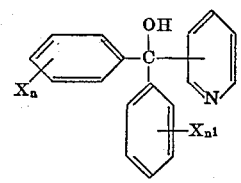

in which X, $n$ and $n^1$ have the same meaning as above, in an inert organic solvent, such as benzene, toluene, cyclohexane, ethers, petroleum ether or methylene chloride, with a reagent suitable for the chlorination of tertiary alcohols, e.g. thionylchloride, phosphoryl chloride or acetyl chloride, and reacting the diaryl-pyridyl-methyl chloride thus-obtained, after removal of the liberated acid, with an acid-binding agent, e.g. an aqueous bicarbonate solution, optionally without an intermediate isolation, by heating the solution (reflux) with an excess (up to about 120%) imidazole or lower alkyl imidazole.

The last step may also be carried out in another solvent than the chlorination. In this case, the solution containing the diaryl-pyridyl-methyl chloride is concentrated, the residue taken up with a polar organic solvent, such as e.g. acetonitrile, dimethyl formamide, acetone, dimethyl sulphoxide or nitromethane, and the reaction is carried out at temperatures of about 0 to about 100° C. with an excess of imidazole. The compounds (I) are isolated from the resultant reaction mixture, for example via the hydrochloride, and the free base separated in usual manner (addition of alkali).

Instead of an excess of imidazole, an equivalent amount may also be used together with another acid-binding agent. The usual organic bases, such as e.g. triethylamine, dimethyl benzylamine or pyridine, but also inorganic compounds, e.g. alkali metal (Na, K) or alkaline earth metal carbonates (e.g. calcium carbonate) are suitable for the above purpose.

The following table shows the substituents of some of the new compounds (I):

TABLE 1

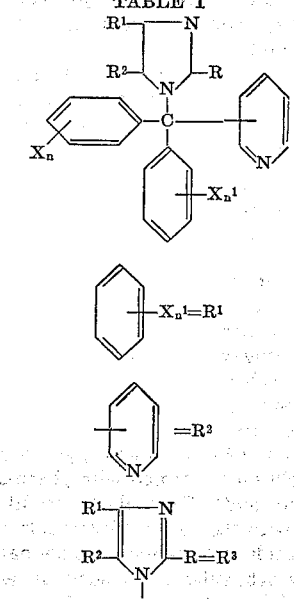

| $R^1$ | $R^2$ | $R^3$ | M.P., degrees |
|---|---|---|---|
| (a) Phenyl | 2-pyridyl | 1-imidazolyl | 222–224 |
| (b) Phenyl | 3-pyridyl | do | 208–210 |
| (c) Phenyl | 4-pyridyl | do | 217–218 |
| (d) 4-fluorophenyl | do | do | 145–146 |
| (e) 4-chlorophenyl | do | do | 157–158 |
| (f) 4-bromophenyl | do | do | 136–139 |
| (g) 4-fluorophenyl | 2-pyridyl | do | 162–164 |
| (h) Phenyl | 4-pyridyl | 2-methyl-1-imidazolyl | 175–178 |
| (i) 2-chlorophenyl | 2-pyridyl | 1-imidazolyl | 145–149 |
| (k) 4-chlorophenyl | do | do | 138–140 |
| (l) 4-bromophenyl | do | do | 133 |
| (m) 3-trifluoromethylphenyl | do | do | 94–96 |
| (n) 4-methylmercaptophenyl | do | do | 150–152 |
| (o) 2-chlorophenyl | 3-pyridyl | do | 116–118 |
| (p) 2-fluorophenyl | do | do | 172–173 |
| (q) 2-fluorophenyl | 2-pyridyl | do | 193–194 |
| (r) 2-chlorophenyl | 4-pyridyl | do | 72–75 |
| (s) 3-chlorophenyl | do | do | 130 |
| (t) 3-trifluoromethylphenyl | do | do | 110–112 |
| (u) 4-methylmercaptophenyl | do | do | 161 |
| (v) 2-fluorophenyl | do | do | 197 |
| (w) 3-nitrophenyl | 2-pyridyl | do | 166 |
| (x) 4-nitrophenyl | do | do | 125 |

| Salts | M.P., ° C. |
|---|---|
| α Lactate of (a) | 170–180 |
| β Salicylate of (a) | 148–152 |
| γ Lactate of (c) | 186–200 |
| Δ Salicylate of (c) | 150–160 |
| ε Hhdrochloride of (w) | ¹105 |

¹ Decomposed.

1-(phenyl-4-fluorophenyl-4-pyridyl)-methyl-imidazole

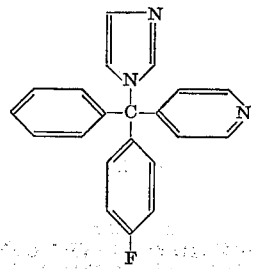

(I)

27.9 g. (0.1 mol) phenyl-4-fluorophenyl-4-pyridyl-carbinol are suspended in 150 ml. dry methylene chloride. There are added thereto, while stirring, 13.0 g. (0.11 mol) thionyl chloride. The mixture is homogeneous after briefly boiling up. It is concentrated and the residue taken up with 30 ml. acetone. The acetone is drawn off in a vacuum at below 50° C. The residue is again mixed with 50 ml. acetone, the mixture is briefly boiled, cooled with ice/sodium chloride and the crystalline hydrochloride of phenyl-4-fluorophenyl-4-pyridyl-methyl chloride is filtered off with suction. Yield: 27.4 g. (82%). The hydrochloride is dried and introduced in small portions into a hot solution at 80° C. of 13.6 g. (0.2 mol) imidazole in 150 ml. acetonitrile. The mixture is subsequently boiled for 5 minutes and then poured into about 0.5 litre of water, 0.5 kg. ice and 50 ml. concentrated hydrochloric acid. The solution is stirred with active charcoal, filtered and slowly adjusted to pH 8–9 with a dilute sodium hydroxide solution. After trituration, 1-(phenyl-4-fluorophenyl-4-pyridyl)-methyl-imidazole is precipitated in crystalline form, filtered off with suction and washed with water.

Yield: 24.3 g. (75% of theory referred to the carbinol). Melting point: 139–141° C.

Compounds (a) to (c) and (e) to (x) of Table 1 are obtained in an analogous manner from the following reactants:

(a) diphenyl-2-pyridyl carbinol, a chlorinating agent for tertiary alcohols and imidazole,
(b) diphenyl-3-pyridyl carbinol, a chlorinating agent for tertiary alcohols and imidazole,
(c) diphenyl-4-pyridyl carbinol, a chlorinating agent for tertiary alcohols and imidazole,
(e) phenyl-4-chlorophenyl-4-pyridyl carbinol, a chlorinating agent for tertiary alcohols and imidazole,
(f) phenyl-4-bromophenyl-4-pyridyl carbinol, a chlorinating agent for tertiary alcohols and imidazole,
(g) phenyl-4-fluorophenyl-2-pyridyl carbinol, a chlorinating agent for tertiary alcohols and imidazole,
(h) diphenyl-4-pyridyl carbinol, a chlorinating agent for tertiary alcohols and 2-methyl-imidazole,
(i) phenyl-2-chlorophenyl-pyridyl carbinol, a chlorinating agent for tertiary alcohols and imidazole,
(k) phenyl-4-chlorophenyl-2-pyridyl carbinol, a chlorinating agent for tertiary alcohols and imidazole,
(l) phenyl-4-bromophenyl-2-pyridyl carbinol, a chlorinating agent for tertiary alcohols and imidazole,
(m) phenyl-3-trifluoromethylphenyl-2-pyridyl carbinol, a chlorinating agent for tertiary alcohols and imidazole,
(n) phenyl-4-methylmercaptophenyl-2-pyridyl carbinol, a chlorinating agent for tertiary alcohols and imidazole,
(o) phenyl-2-chlorophenyl-3-pyridyl carbinol, a chlorinating agent for tertiary alcohols and imidazole,
(p) phenyl-2-fluorophenyl-3-pyridyl carbinol, a chlorinating agent for tertiary alcohols and imidazole,
(q) phenyl-2-fluorophenyl-2-pyridyl carbinol, a chlorinating agent for tertiary alcohols and imidazole,
(r) phenyl-2-chlorophenyl-4-pyridyl carbinol, a chlorinating agent for tertiary alcohols and imidazole,
(s) phenyl-3-chlorophenyl-4-pyridyl carbinol, a chlorinating agent for tertiary alcohols and imidazole,
(t) phenyl-3-trifluoromethylphenyl-4-pyridyl carbinol, a chlorinating agent for tertiary alcohols and imidazole,
(u) phenyl-4-methylmercaptophenyl-4-pyridyl carbinol, a chlorinating agent for tertiary alcohols and imidazole,
(v) phenyl-2-fluorophenyl-4-pyridyl carbinol, a chlorinating agent for tertiary alcohols and imidazole,
(w) phenyl-3-nitrophenyl-2-pyridyl carbinol, a chlorinating agent for tertiary alcohols and imidazole,
(x) phenyl-4-nitrophenyl-2-pyridyl carbinol, a chlorinating agent for tertiary alcohols and imidazole.

Salts of N-diaryl-pyridyl-methyl-imidazoles are produced in the following manner.

N-diphenyl-2-pyridyl-methyl-imidazolium salicylate (k).

31.1 g. (0.1 mol) N-diphenyl-2-pyridyl-methylimidazole are suspended in 300 ml. anhydrous ether. 13.8 g. (0.1 mol) pulverized salicylic acid are added, the mixture is boiled under reflux and with stirring for 6 hours and completely concentrated. The residue is dried over $P_2O_5$. The salicylate is a somewhat hydroscopic white powder.

Melting point: 148–152° C.; yield 43.9 g. (100%).

The following salts were obtained in an analogous manner by reacting the corresponding imidazole with lactic acid or salicylic acid:

M.P., ° C.

α N - diphenyl - 2 - pyridylmethyl - imidazolium-lactate _____ 170–180
Δ N - diphenyl - 4 - pyridylmethyl - imidazolium-salicylate _____ 150–160
γ N - diphenyl - 4 - pyridylmethyl - imidazoliumlactate _____ 186–200

The compounds of the present invention are superior to known antimycotic agents because the known antimycotic agents are effective either against yeasts alone, e.g. the Amphotericin B, or only against zygomycetes, e.g. the Griseofulvin.

In contrast thereto, the compounds of the present invention which includes the salts as well as the bases are effective upon oral administration against zygomycetes as well as against yeasts. In addition, the compounds of the present invention are compatible for administration to warm blooded animals.

The compounds of the present invention may be administered in the form of an aqueous emulsion, suspension or solution, either using the compounds per se or utilizing the compounds in the form of their salts.

Therapeutical effect

In vitro effectiveness against humanopathogenic fungi:

The new compounds (I) and their salts with physiologically compatible acids show good fungistatic action against dermatophytes and yeasts which occur in humans and animals as disease-causing agents.

The minimum inhibition concentrations in vitro on Sabourouds milieu d'epreuve are summarized in the following table (all data as γ/ml. substrate):

MINIMUM INHIBITION CONCENTRATION AS γ/ml. IN VITRO

| Compound | Trichophyton mentagrophytes | | Candida albicans | | Penic. commune | Aspergillus niger | | Microsp. felineum |
|---|---|---|---|---|---|---|---|---|
| | Without serum | With serum | Without serum | With serum | | Without serum | With serum | |
| c | <4 | <4 | 20 | 100 | 10 | 10 | 10 | 20 |
| a | <4 | <4 | 40 | 100 | 20 | 10 | 40 | 10 |
| b | <4 | <4 | 20 | 100 | 200 | 4 | 20 | 10 |
| h | 100 | | 100 | | 100 | | | |
| d | <4 | <4 | 10 | 100 | 20 | 20 | 100 | 20 |
| e | <4 | <4 | 4 | 40 | 20 | 20 | 100 | 20 |
| g | <4 | <4 | 4 | 4 | <4 | <4 | <4 | <4 |
| f | <4 | <4 | 4 | 40 | 20 | 40 | 100 | 10 |
| i | <4 | <4 | 10 | 100 | <4 | 10 | 20 | 10 |
| k | <4 | <4 | 10 | 40 | <4 | 10 | 20 | 10 |
| l | <4 | <4 | 10 | 100 | 10 | 20 | 40 | 20 |
| n | <4 | <4 | 10 | 100 | 10 | 20 | 40 | 10 |

MINIMUM INHIBITION CONCENTRATION AS γ/ml IN VITRO AND EFFECTS IN VIVO

| Compound | Trichophyton mentagrophytes | Candida albicans | Penic. commune | Asperg. niger | Microsp. felineum | In vivo Candida TV | In vivo Trich. TV |
|---|---|---|---|---|---|---|---|
| m | <4 | 4 | <4 | <4 | <4 | Effect | Effect |
| o | <4 | 20 | 4 | <4 | <4 | do | |
| p | <4 | 20 | 10 | <4 | <4 | | |
| q | <4 | 4 | 10 | 4 | <4 | Effect | |
| r | <4 | 4 | 10 | 4 | <4 | do | Effect |
| s | <4 | 4 | <4 | 4 | <4 | do | |
| t | <4 | 4 | 10 | 20 | <4 | do | |
| u | 10 | 4 | 40 | 40 | 20 | | |
| v | <4 | 10 | 10 | <4 | <4 | | |
| e | <4 | 10 | 10 | <4 | <4 | | |

Effect in vivo

The tests were carried out with the compounds (a), (b), (h), (i), (k), (l), (m), (n), (o), (q), (r), (s), (t) and (g). The new compounds had a good effectiveness on the experimental Candidosis in white mice. Particularly good effects were achieved with the compound (g). The new compounds were administered orally in amounts of about 50 to about 100 mg./kg. animal weight one to three times daily over a period of 4 days. More than 95% of the infected animals survived the infection. The infection took a lethal course in the case of the untreated control animals.

Experimental trichophytia

An oral dose of about 25 to 30 mg./kg. of the compound (g) or (k), (m), (n), (s) administered twice daily to guinea pigs (weight of the guinea pigs between 400 to 600 g.) prevents the start of the infection (*Trichophyton mentagrophytes* and *Trichophyton rubrum*). In the therapeutic experiment a rapid healing of the mycotic lesion takes place. If the compound (g) is replaced by the other compounds mentioned above [(a) to (f), (h)] or their salts [(i) to (m)], then similar results are obtained.

In mice, rats, rabbits, dogs and cats the $LD_{50}$ ranges from about 300 to about 1000 mg./kg. when orally administered.

Of special interest for practical use are the compounds which are unsubstituted on the imidazole ring and which may optionally be substituted in one phenyl radical by a halogen atom (preferably chlorine or fluorine in the o-, m- or p-position) as well as the salts thereof with hydrochloric acid, lactic acid or salicylic acid.

The compounds (I) and their salts are useful as antimycotic agents against the following mycoses:

In human medicine (1) Dermatomycoses caused by fungi of the species Trichophytes, Microsporium, Epidermophytes, Aspergillus, *Candida albicans* and other yeasts.

(2) Organomycoses caused by yeasts, mould fung and dermatophytes.

In veterinary medicine

Dermatomycoses and organomycoses caused by yeasts, mould fungi and dermatophytes.

The therapeutical application can be effected orally or parenterally and also locally in the form of solutions (e.g. dimethyl sulphoxide/glycerol/water [2:2:6]), alcohol, preferably ethanol and isopropanol, buffer solutions, powders, tablets.

The dosage for humans ranges on average between about 20 and 100 mg./kg. body weight, preferably about 40 to about 60 mg./kg., at intervals of 12 hours over a period of about 10 to about 20 days.

It may, nevertheless, be necessary to deviate from the indicated amounts, viz. dependent upon the type of the method of application but also due to the individual behaviour towards the medicament or the kind of its formulation and the time or interval when it is administered. Thus, it may be sufficient in some cases to administer less than the abovementioned minimum amount, whereas in other cases the abovementioned upper limit should be exceeded. In the case of administering larger amounts, it can be advisable to distribute these in several individual doses over the day.

The antimycotic agents can be used as such or in combination with pharmaceutically acceptable carriers. Tablets, capsules, powders, sprays, aqueous suspensions, injectable solution, elixirs, syrups and the like in combination with various inert carriers are suitable forms of application. Carriers of this type include solid diluents or fillers, a sterile aqueous medium as well as non-toxic organic solvents and the like. Tablets and the like suitable for oral application can obviously also be provided with a sweetening additive and similar substances. In the above-mentioned case, the therapeutically effective compound should be present at a concentration of about 0.5 to 90 percent by weight of the total mixture, i.e. in amounts sufficient to reach the above-mentioned dosing range.

If the tablets are orally administered, they may obviously also contain additives, such as sodium citrate, calcium carbonate and dicalcium phosphate together with various additives, such as starch, preferably potato starch and the like, and binding agents, such as polyvinyl pyrrolidone, gelatins and the like. Lubricants, such as magnesium stearate, sodium lauryl sulphate and talc may concurrently be used for the preparation of tablets. In the case of aqueous suspensions and/or elixirs which are intended for oral application, the active substance can be used with various agents improving the taste, coloring substances, emulsifiers and/or together with diluents, such as water, ethanol, propylene glycol, glycerol and similar compounds of this type or combinations thereof.

In the case of parenteral application, solutions of the active substances in sesam or peanut oil, or in aqueous propylene glycol or N,N-dimethyl-formamide can be employed, but also sterile aqueous solutions in the case of water-soluble compounds. Such aqueous solutions should, if necessary, be buffered in conventional manner; furthermore, the liquid diluent should, from the start, be rendered isotonic by the addition of the required amounts of salt or glucose. Aqueous solutions of this kind are especially suitable for intravenous, intramuscular and intraperitoneal injections.

The preparation of such sterile aqueous media is carried out in known manner.

What is claimed is:

1. A pharmaceutical composition useful against fungal infections which comprises an antifungally effective amount of N-diaryl-pyridyl-methyl-imidazole of the formula:

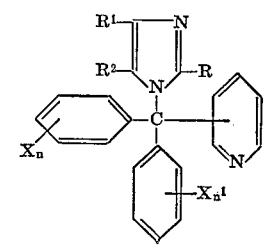

or a pharmaceutically acceptable nontoxic salt thereof wherein

R, $R^1$ and $R^2$ are each hydrogen or straight or branched chain lower alkyl;

X is straight or branched chain alkyl of 1 to 12 carbon atoms, or an electronegative moiety selected from the group consisting of halogen, nitro, trifluoromethyl and lower alkyl mercapto;

$n$ nd $n^1$ are integers from 0 to 2; in combination with a pharmaceutically acceptable nontoxic inert diluent or carrier.

2. A pharmaceutical composition according to claim 1 wherein R, $R^1$ and $R^2$ are each hydrogen or lower alkyl of 1 to 4 carbon atoms; X is lower alkyl of 1 to 4 carbon atoms, halogen, nitro, cyano, trifluoromethyl or lower alkyl mercapto; $n$ is 0 and $n^1$ is 1.

3. A pharmaceutical composition according to claim 2 wherein one of R, $R^1$ and $R^2$ is methyl.

4. A pharmaceutical composition according to claim 1 wherein the N-diaryl-pyridyl-methyl-imidazole is in the form of a pharmaceutically acceptable nontoxic salt.

5. A pharmaceutical composition according to claim 1 wherein R, $R^1$ and $R^2$ are each hydrogen; or one of R, $R^1$, or $R^2$ is methyl; $n$ is 0; X is fluoro, bromo, chloro, nitro, trifluoromethyl or methyl mercapto; and $n^1$ is 1.

6. A pharmaceutical composition according to claim 5 wherein R, $R^1$ and $R^2$ are each hydrogen.

7. A pharmaceutical composition according to claim 1 wherein R, $R^1$ and $R^2$ are each hydrogen; $n$ is 0; $n^1$ is 1.

8. A pharmaceutical composition according to claim 1 wherein R, $R^1$ and $R^2$ are hydrogen, X is halogen, $n$ is 0 and $n^1$ is 1.

9. A pharmaceutical composition according to claim 1 wherein the N-diaryl-pyridyl-methyl-imidazole is 1-phenyl-4-fluorophenyl-4-pyridyl-methyl-imidazole.

10. A pharmaceutical composition according to claim 1 wherein the N-diaryl-pyridyl-methyl-imidazole is N-diphenyl-2-pyridyl-methyl-imidazole.

11. A pharmaceutical composition according to claim 1 wherein the N-diaryl-pyridyl-methyl-imidazole is diphenyl-3-pyridyl-methyl-imidazole.

12. A pharmaceutical composition according to claim 1 wherein the N-diaryl-pyridyl-methyl-imidazole is diphenyl-4-pyridyl-methyl-2-methyl-imidazole.

13. A pharmaceutical composition according to claim 1 wherein the N-diaryl-pyridyl-methyl-imidazole is diphenyl-4-pyridyl-methyl-imidazole.

14. A pharmaceutical composition according to claim 1 wherein the N-diaryl-pyridyl-methyl-imidazole is phenyl-4-chlorophenyl-2-pyridyl-methyl-imidazole.

15. A pharmaceutical composition according to claim 1 wherein the N-diaryl-pyridyl-methyl-imidazole is phenyl-4-bromophenyl-2-pyridyl-methyl-imidazole.

16. A pharmaceutical composition according to claim 1 wherein the N-diaryl-pyridyl-methyl-imidazole is phenyl-4-fluorophenyl-2-pyridyl-methyl-imidazole.

17. A method of treating fungal infections in humans and animals which comprises administering to a human or animal an antifungally effective amount of an N-diaryl-pyridyl-methyl-imidazole of the formula:

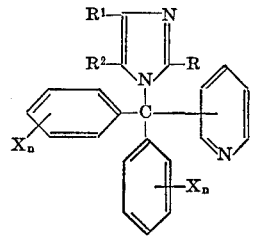

or a pharmaceutically acceptable nontoxic salt thereof wherein

R, $R^1$ and $R^2$ are each hydrogen, straight or branched chain lower alkyl;

X is straight or branched chain alkyl of 1 to 12 carbon atoms, or an electronegative moiety selected from the group consisting of halogen, nitro, trifluoromethyl and lower alkyl mercapto;

$n$ and $n^1$ are integers from 0 to 2.

18. A method of treatment according to claim 17 wherein R, $R^1$ and $R^2$ are each hydrogen or lower alkyl of 1 to 4 carbon atoms; X is lower alkyl of 1 to 4 carbon atoms, halogen, nitro, cyano, trifluoromethyl or lower alkyl mercapto; $n$ is 0 and $n^1$ is 1.

19. A method of treatment according to claim 17 wherein one of R, $R^1$ and $R^2$ is methyl.

20. A method of treatment according to claim 17 wherein the N-diaryl-pyridyl-methyl-imidazole is in the form of a pharmaceutically acceptable nontoxic salt.

21. A method of treatment according to claim 17 wherein R, $R^1$ and $R^2$ are each hydrogen; or one of R, $R^1$ or $R^2$ is methyl; $n$ is 0; X is fluoro, bromo, chloro, nitro, trifluoro methyl or methyl mercapto; and $n^1$ is 1.

22. A method of treatment according to claim 17 wherein R, $R^1$ and $R^2$ are each hydrogen; $n$ is 0; $n^1$ is 1.

23. A method of treatment according to claim 17 wherein R, $R^1$ and $R^2$ are each hydrogen.

24. A method of treatment according to claim 17 wherein R, $R^1$ and $R^2$ are hydrogen, X is halogen, $n$ is 0 and $n^1$ is 1.

25. A method of treatment according to claim 17 wherein the N-diaryl-pyridyl-methyl-imidazole is 1-phenyl-4-fluorophenyl-4-pyridyl-methyl-imidazole.

26. A method of treatment according to claim 17 wherein the N-diaryl-pyridyl-methyl-imidazole is N-diphenyl-2-pyridyl-methyl-imidazole.

27. A method of treatment according to claim 17 wherein the N-diaryl-pyridyl-methyl-imidazole is diphenyl-3-pyridyl-methyl-imidazole.

28. A method of treatment according to claim 17 wherein the N-diaryl-pyridyl-methyl-imidazole is diphenyl-4-pyridyl-methyl-2-methyl-imidazole.

29. A method of treatment according to claim 17 wherein the N-diaryl-pyridyl-methyl-imidazole is diphenyl-4-pyridyl-methyl-imidazole.

30. A method of treatment according to claim 17 wherein the N-diaryl-pyridyl-methyl-imidazole is phenyl-4-chlorophenyl-2-pyridyl-methylimidazole.

31. A method of treatment according to claim 17 wherein the N-diaryl-pyridyl-methyl-imidazole is phenyl-4-bromophenyl-2-pyridyl-methylimidazole.

32. A method of treatment according to claim 17 wherein the N-diaryl-pyridyl-methyl-imidazole is phenyl-4-fluorophenyl-2-pyridyl-methyl-imidazole.

33. A method of treatment according to claim 17 wherein the antifungally effective amount is from 20 to 100 mg./kg. administered during each 12-hour period for 10 to 20 days.

34. A method of treatment according to claim 17 wherein the antifungally effective amount is from 40 to 60 mg./kg. administered during each 12-hour period for 10 to 20 days.

References Cited

Staab et al., Ann., Chem. 694, pp. 91–7 (1966).

JEROME D. GOLDBERG, Primary Examiner

UNITED STATES PATENT OFFICE
CERTIFICATE OF CORRECTION

Patent No. 3,737,531　　　　　　　　Dated June 5, 1973

Inventor(s) Wilfried Draber et al.

It is certified that error appears in the above-identified patent and that said Letters Patent are hereby corrected as shown below:

Column 1, insert --Priority of German Application P1770939.6, filed July 20, 1968 is claimed.--

Column 1, line 62, change "P.S." to --U.S.--.

Signed and sealed this 8th day of January 1974.

(SEAL)
Attest:

EDWARD M. FLETCHER, JR.　　　　　RENE D. TEGTMEYER
Attesting Officer　　　　　　　　　Acting Commissioner of Patents

UNITED STATES PATENT OFFICE
CERTIFICATE OF CORRECTION

Patent No. 3,737,531                              Dated   June 5, 1973

Inventor(s) Wilfried Draber, Karlheinz Buchel, and Manfred Plempel, assignors to Farbenfabriken Bayer Aktiengesellschaft It is certified that error appears in the above-identified patent and that said Letters Patent are hereby corrected as shown below:

IN THE ABSTRACT OF THE DISCLOSURE:

Column 1,

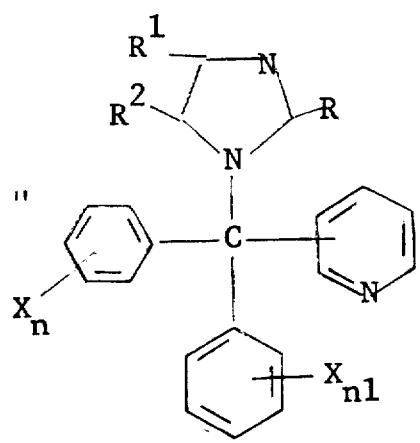   "   should be   -- 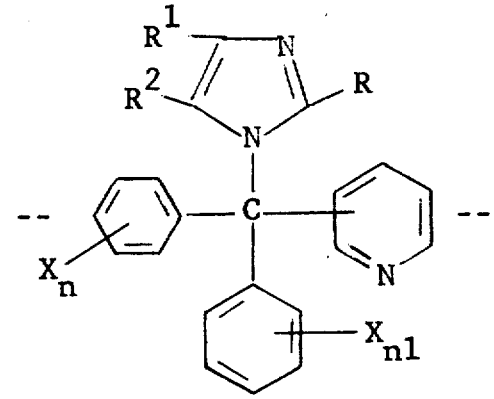 --

UNITED STATES PATENT OFFICE
CERTIFICATE OF CORRECTION

Patent No. 3,737,531  Dated June 5, 1973

Inventor(s) Wilfried Draber et al.  (PAGE 2)

It is certified that error appears in the above-identified patent and that said Letters Patent are hereby corrected as shown below:

IN THE ABSTRACT OF THE DISCLOSURE (continued):

Column 1, line 62, change "P.S." to -- U.S. --.

Column 2, first formula,

" 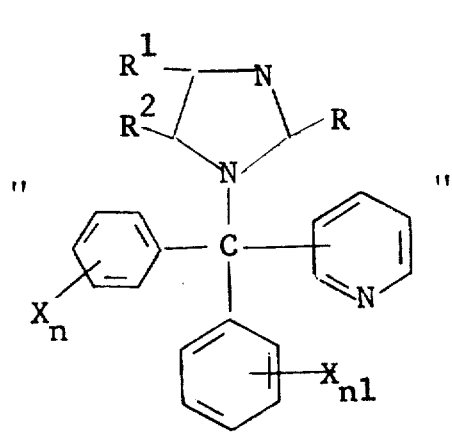 "  should be  -- 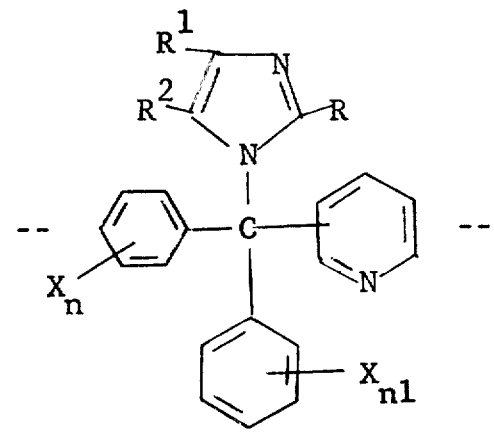 --

UNITED STATES PATENT OFFICE
CERTIFICATE OF CORRECTION

Patent No. 3,737,531  Dated June 5, 1973

Inventor(s) Wilfried Draber et al.  (PAGE 3)

It is certified that error appears in the above-identified patent and that said Letters Patent are hereby corrected as shown below:

IN THE ABSTRACT OF THE DISCLOSURE (continued):

Column 3, Table 1,

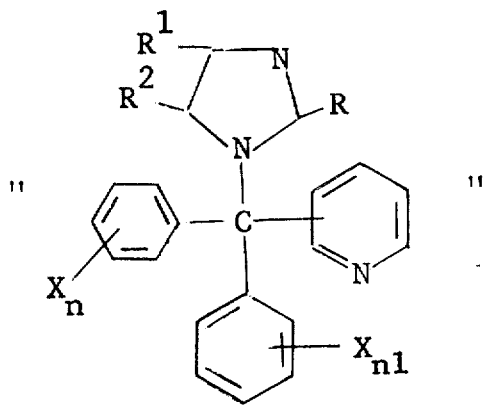   should be   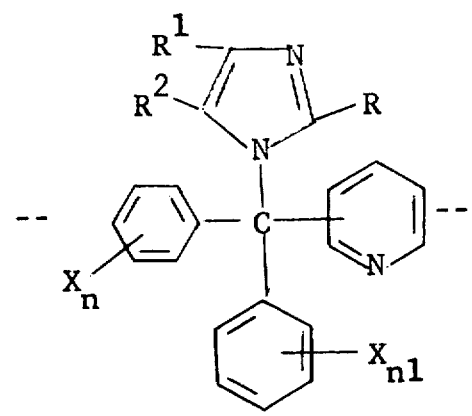

Signed and Sealed this fifth Day of August 1975

[SEAL]

Attest:

RUTH C. MASON
Attesting Officer

C. MARSHALL DANN
Commissioner of Patents and Trademarks